Patented Aug. 28, 1934

1,971,398

UNITED STATES PATENT OFFICE 1,971,398

COATING MATERIAL USEFUL IN THE MANUFACTURE OF ARTIFICIAL LEATHER

Alfons Fausten, Leipzig, Germany, assignor to I. G. Farbenindustrie Aktiengesellschaft, Frankfort-on-the-Main, Germany, a corporation of Germany No Drawing. Application December 10, 1928, Serial No. 325,127. In Germany December 13, 1927

4 Claims. (Cl. 134—79)

The present invention relates to a coating material for producing nontransparent coatings, and more particularly to coating materials obtained by working a mixture of cellulose ester, a softening or gelatinizing agent, an insoluble pigment and a swelling agent under pressure on heated rollers. Another object of my invention is the manufacture of artificial leather with the coating material thus obtained.

Coating material to be applied for example in the manufacture of artificial leather has hitherto been made by milling the coloring matter with castor oil in a color mill to produce a paste of thick consistency; nitrocellulose was gelatinized in the presence of a swelling agent and a softening agent. The color paste and the gelatinized nitrocellulose were milled together in a plate mill or kneading machine in order to form a uniform and apparently homogeneous mass.

The artificial leather made with this coating material has a dull surface; in order to make it lustrous it has been coated with a lacquer. By carrying the subdivision of the pigment to a colloidal condition there is indeed obtained a lustrous coating which, however, is transparent and therefore cannot be used in the production of artificial leather.

According to this invention a lustrous and nontransparent coating, that is to say one with a good covering power, which is at the same time of a high degree of toughness and of a soft feel, is obtained by using a coating material the constituents of which are thoroughly subdivided and most intimately mixed by an intensive working in a suitable machine; for instance on rollers; this working, however, is carried only so far that the color pigment or filling agent does not pass into the colloidal condition.

The subdivision of the coloring or filling matter in the coating material is easily controlled by dissolving the mixture in a suitable solvent. In the first instance, an apparently homogeneous mixture is obtained from which, however, the pigment or filling agent settles after some hours.

Coatings obtained with such a coating material have the advantages of a high degree of resistance to cracking and of high extensibility, even when the content of pigment or filling agent is high. An essential advantage of the invention is that it renders possible the use of coating materials which have a comparatively low content of the gelatinizing agent, which is generally costly, and therefore a higher content of pigment or filling agent and oil, without liability for the oil to separate or for the quality to deteriorate. This contrasts favorably with varnishes made by the known methods.

The following examples illustrate the invention, without limiting it thereto, the parts being by weight:—

Example 1

| | Parts of |
|---|---|
| Nitrocellulose | 100 |
| Castor oil | 100 |
| Camphor | 50 |
| Lamp black | 50 |
| Alcohol | 100 | are mixed in a kneading machine and are worked for two hours on rollers which are heated to about 60–80° C., under a pressure of about 30–100 atmospheres, until the content of alcohol is reduced to about 20 parts. The mass leaves the rollers in the form of a pliant elastic plate or with the character of crepe rubber.

Example 2

| | Parts of |
|---|---|
| Acetylcellulose | 100 |
| Triacetin or dimethylphthalate | 130 |
| Alcohol | 100 |
| Ochre | 35 | are mixed in a kneading machine and then worked on rollers for 2½ hours in the manner described in Example 1. There is obtained a product of properties similar to those described in Example 1.

In this manner there is produced an elastic or rubber-like mass containing a substantial proportion of an oil and homogenized to such a degree that there is no separation of oil even when the mass is subjected to pressures of about 200 atmospheres. It is thus possible to provide the user with a homogeneous solid material, it being only necessary to dissolve a measured quantity of the material in a suitable solvent in order to produce a dope containing all the necessary ingredients in the proper proportions.

The coating materials made as described in the examples may be dissolved in the usual manner in a solvent of low boiling point, and if necessary after further addition of oil, may be applied to suitable supports, such as textile webs. When the product is completely dry it constitutes an artificial leather which is lustrous, of soft feel, of high resistance to cracking and of high extensibility.

In the following claims the term "plastifying agent" comprises the softening and gelatinizing agents usually added to cellulose derivatives in making varnishes, films, or artificial leather.

What I claim is:—

1. The process which comprises working a mixture containing about 100 parts of nitrocellulose, about 100 parts of castor oil, about 50 parts of camphor, about 50 parts of lamp black and about 100 parts of alcohol for 2 hours on rollers heated to about 60–80° C. under a pressure of about 30–100 atmospheres until the content of alcohol is reduced to about 20 parts.

2. The process of manufacturing a coating material which consists in thoroughly subdividing and most intimately mixing a cellulose ester, a gelatinizing agent, a substantial proportion of an oil at least equal to the quantity of the cellulose ester, and a pigment by working the materials together on heated rollers under a pressure of about 30 to 100 atmospheres in the presence of a volatile solvent in an amount insufficient to dissolve the cellulose ester, under such conditions of temperature that a large proportion of the solvent is evaporated during the operation, but without bringing the pigment into the colloidal condition.

3. The process of manufacturing a coating material which consists in thoroughly subdividing and most intimately mixing a cellulose ester, a gelatinizing agent, a substantial proportion of an oil at least equal to the quantity of the cellulose ester, and a pigment by working the materials together on rollers heated to about 60 to 80° C. under a pressure of about 30 to 100 atmospheres in the presence of a volatile solvent in an amount insufficient to dissolve the cellulose ester, for 1 to 5 hours, until a large proportion of the solvent is evaporated during the operation, but without bringing the pigment into the colloidal condition.

4. The process of manufacturing a coating material which consists in thoroughly subdividing and most intimately mixing nitrocellulose, camphor, a substantial proportion of castor oil at least equal to the quantity of nitrocellulose, a pigment, and alcohol in an amount insufficient to dissolve the nitrocellulose by working the materials together for about 2 hours on rollers heated to about 60 to 80° C. under a pressure of about 30 to 100 atmospheres.

ALFONS FAUSTEN.